United States Patent [19]
Brown

[11] 3,917,044
[45] Nov. 4, 1975

[54] LANE BRAKE ASSEMBLY
[75] Inventor: William L. Brown, Easton, Pa.
[73] Assignee: SI Handling Systems, Inc., Easton, Pa.
[22] Filed: Apr. 3, 1974
[21] Appl. No.: 457,688

[52] U.S. Cl................ 193/40; 193/35 A; 221/289
[51] Int. Cl.²........................................ B65G 11/20
[58] Field of Search......... 193/40, 35 A, 32, 38, 41; 221/289, 290, 294, 295, 298

[56] References Cited
UNITED STATES PATENTS

| | | | |
|---|---|---|---|
| 1,425,599 | 8/1922 | Lister | 193/32 X |
| 3,064,783 | 11/1962 | McClelland | 193/38 |
| 3,088,569 | 5/1963 | McClelland | 193/40 |
| 3,091,317 | 5/1963 | Just | 193/38 |
| 3,250,361 | 5/1966 | Bystedt | 193/35 A |
| 3,532,201 | 10/1970 | McConnell | 193/40 X |
| 3,724,642 | 4/1973 | De Good | 193/35 A X |
| 3,830,409 | 8/1974 | Jenkinson | 221/289 X |

FOREIGN PATENTS OR APPLICATIONS

| | | | |
|---|---|---|---|
| 1,953,901 | 5/1971 | Germany | 193/35 A |
| 1,441,637 | 5/1966 | France | 193/38 |

*Primary Examiner*—Richard A. Schacher
*Assistant Examiner*—James L. Rowland
*Attorney, Agent, or Firm*—Seidel, Gonda & Goldhammer

[57] ABSTRACT

A lane brake assembly is provided for controlling discharge of containers from a supply lane so as to apply a brake means to the second container in the line whereby containers are discharged one at a time. Discharge is controlled by a release mechanism which is movable to a release position whereby the brake means is automatically applied so long as the release mechanism is in its release position.

7 Claims, 5 Drawing Figures

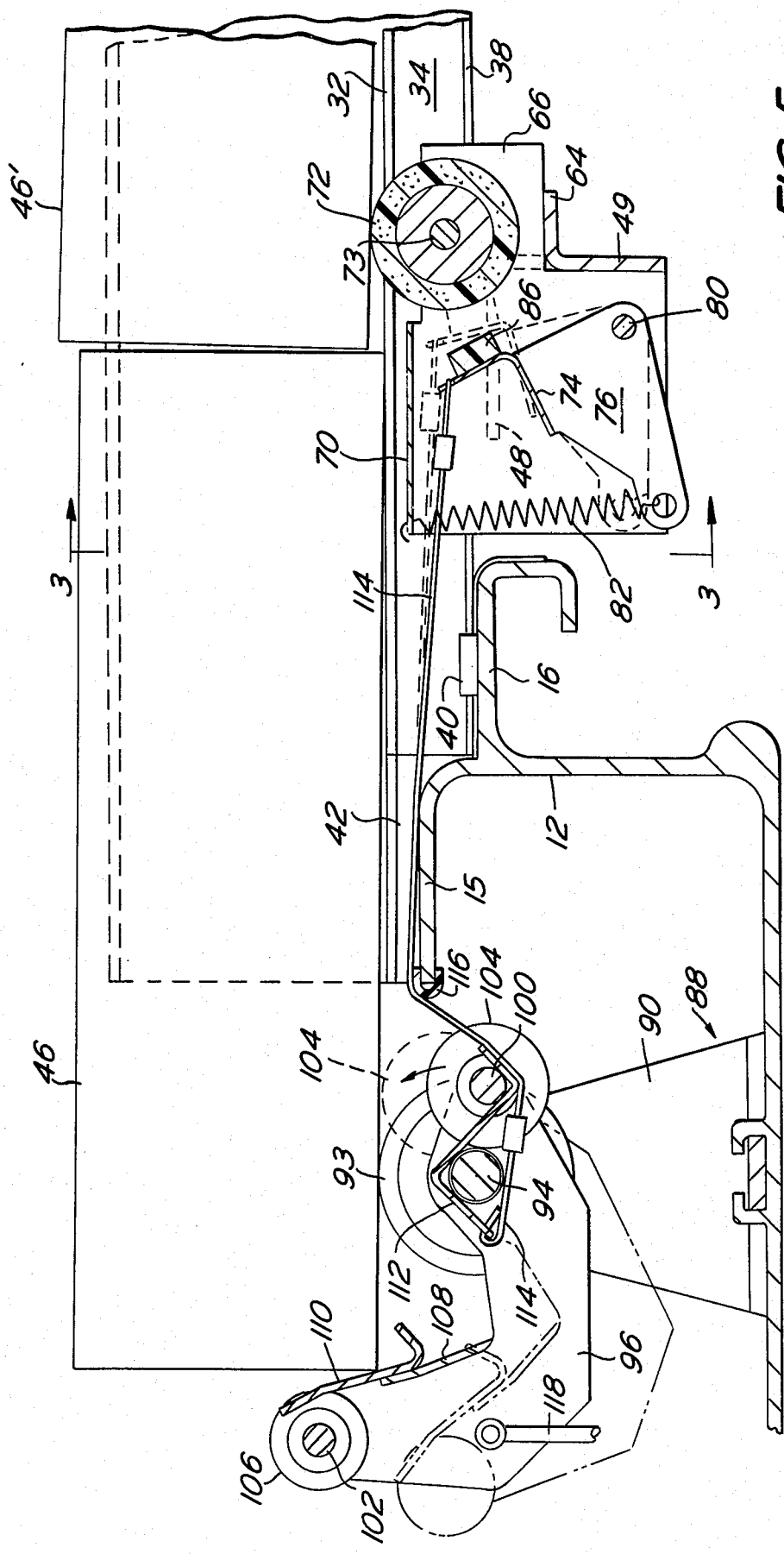
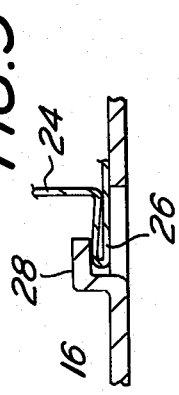
FIG. 5
FIG. 2

LANE BRAKE ASSEMBLY

DISCLOSURE

In an automatic warehouse, containers of goods are stored one behind the other in lanes. The containers are biased to a discharge position due to gravity and/or by a spring force applied to the last container in the lane. At the discharge end of the lane, there is provided a selectively operable release mechanism intended to permit discharge of the first container in the lane. On occasion, a run-out situation occurs wherein two or more containers are simultaneously discharged. The present invention is directed to a lane brake assembly intended to permit the containers to be discharged serially.

The lane brake assembly in accordance with the present invention includes a brake means for applying a braking force to the second container in the lane when the release mechanism is in its release position. When the release mechanism is in its blocking position, the braking force is released. The lane brake assembly of the present invention is adapted to be incorporated in new equipment and is structurally interrelated in a manner whereby it may be quickly applied to existing equipment in the field.

The brake assembly includes a roller selectively positionable from the release mechanism so as to be beneath the second container. Each container in the lane will roll over the roller. A brake shoe is biased toward the roller to prevent the roller from rotating. The brake shoe is held in an inoperative position by a flexible wire-like member connected to the release mechanism. The flexible wire-like member connected to the release mechanism. The wire-like member may be supplied in three lengths such as small, medium and long whereby most of the situations encountered can be accommodated. The wire-like member may be wire, cord, chain or the like.

It is an object of the present invention to provide a lane brake assembly for controlling discharge of containers from a lane in a manner whereby the containers can only discharge one at a time.

It is another object of the present invention to provide a lane brake assembly adapted for use on new equipment and easily attached to existing equipment in the field.

It is another object of the present invention to provide a lane brake assembly which is simple, inexpensive, and reliable.

It is another object of the present invention to provide a lane brake assembly which is readily adjustable to a variety of positions as a function of the length of the container.

For the purpose of illustrating the invention, there is shown in the drawings a form which is presently preferred; it being understood, however, that this invention is not limited to the precise arrangements and instrumentalities shown.

FIG. 2 is a sectional view taken along the line 2—2 in FIG. 1.

FIG. 5 is a sectional view taken along the line 5—5 in FIG. 1.

Figure 1:
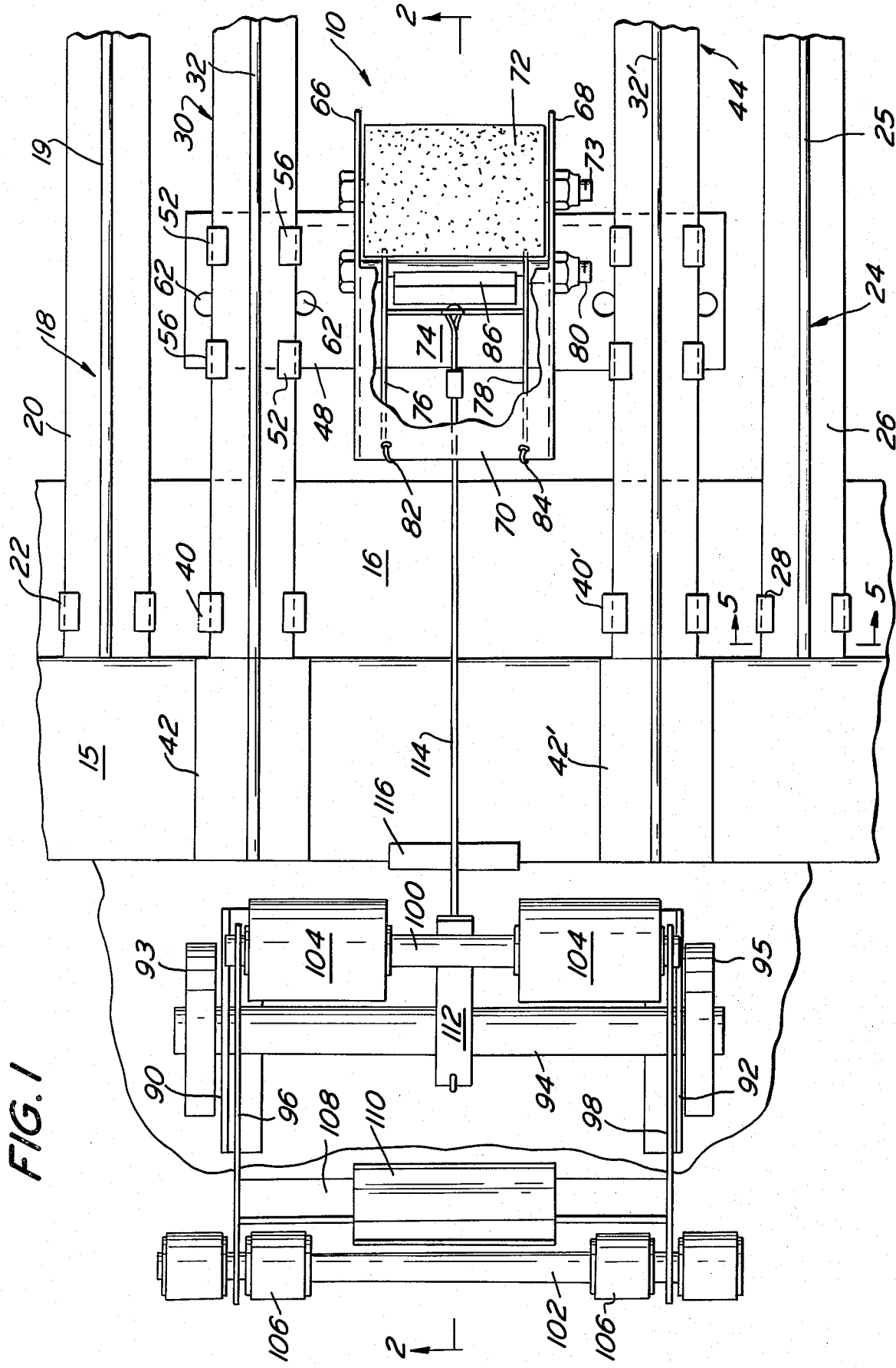
FIG. 1 is a plan view of a lane containing a brake assembly in accordance with the present invention.

Referring to the drawing in detail, wherein like numerals indicate like elements, there is shown in FIG. 1 a lane brake assembly in accordance with the present invention designated generally as 10. The assembly 10 is shown installed on lane structure wherein containers are disposed one behind the other and are biased to a discharge position in any convenient manner such as by gravity, a spring biased plunger engaging the last container in the row, etc.

Figure 3:
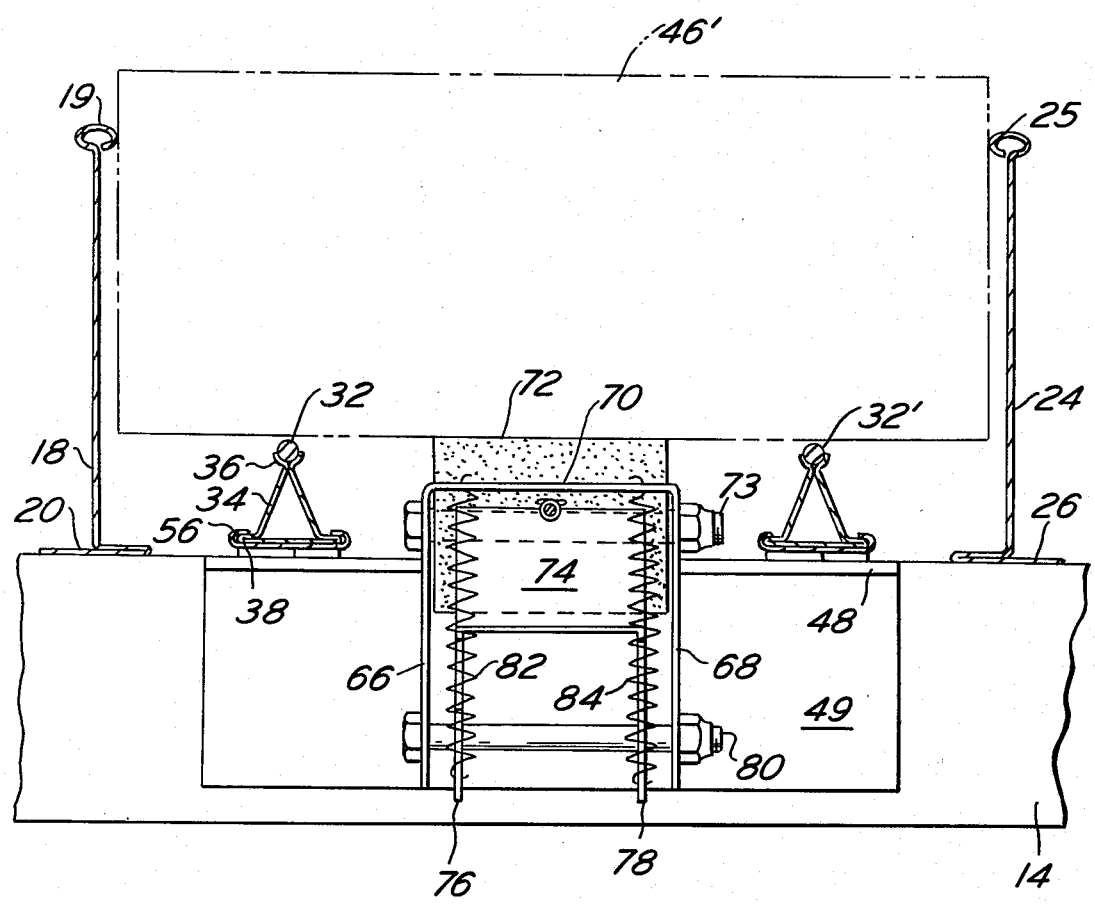
FIG. 3 is a sectional view taken along the line 3—3 in FIG. 2.

Referring to FIGS. 2 and 3, there is shown parallel beams 12 and 14 which form part of the support structure for the lanes. Beam 12 is at the release or discharge end of the lanes. Hence, beam 14 will be at a higher elevation if the lanes are gravity biased to the discharge end. Beam 12 has horizontally disposed flanges 15 and 16 at different elevations. See FIG. 2.

Each lane is defined by lane dividers. See FIG. 3. Lane divider 18 has a bead 19 at its upper end and a flange 20 at its lower end. The flange 20 extends to opposite sides of the lane divider 18. Flange 20 is releasably coupled to the flange 16 on beam 12 by way of clips 22.

The lane divider 24 has a bead 25 at its upper end and a flange 26 at its lower end. The flange 26 extends to opposite sides of the lane divider 24. Flange 26 is releasably connectd to the upper surface of flange 16 on beam 12 by clips 28.

The discharge end of the lane dividers 18 and 24 as shown in FIGS. 1 and 2 are supported by the flange 16 in a removable manner. Thus, the distance between the adjacent lane dividers 18 and 24 may be readily adjusted to accommodate different width boxes or containers. The clips 22 and 28 may assume a wide variety of forms. These clips are preferably in the form as shown in FIG. 5 wherein they have been punched out of the flange 16 and are integral therewith. The lane dividers 18 and 24 are installed by being slid in an axial direction so that their flanges slide under cooperating clips. Flange 16 on beam 12 has clips, such as clips 22 and 28, at spaced points along its length.

Between adjacent lane dividers 18, 24, there is provided at least one runner support for supporting the containers disposed between the lane dividers. In the illustrated embodiment, two inclined runner suppports 30 and 44 are shown. Since the runner supports are identical, only runner support 30 will be described in detail.

The runner support 30 includes a bar-like runner 32 supported from below by a generally triangular-shaped member 34. The member 34 includes lip portions 36 at its upper end for embracing the runner 32 and flanges 38 at its lower end. The forward end of the runner 30 is releasably supported by flange 16 by way of the clips 40. Similar clips 40' are provided for the runner support 44. The runner 32 is adapted to have line contact with the containers and is preferably made from a polymeric plastic material having a very low coefficient of friction. Any one of a wide variety of self-lubricating plastic materials may be utilized as the runner 32. Support 30 has an extension 42 which overlies flange 15.

Referring to FIG. 2, it will be noted that the first container in the lane is designated 46 and the next adjacent container is designated 46'. The brake assembly of the present invention includes a support member 48 positioned or spaced from the beam 12 so as to be beneath the forward portion of the container 46'. The member 48 may be an angle member having a vertical wall 49. See FIG. 4. The member 48 is releasably secured to and supported by the runner supports 30 and 44.

The support member 48 is releasably connected to the runner supports 30 and 44 in an adjustable manner so that it may be moved as the length of the containers 46, 46' are changed.

Figure 4:
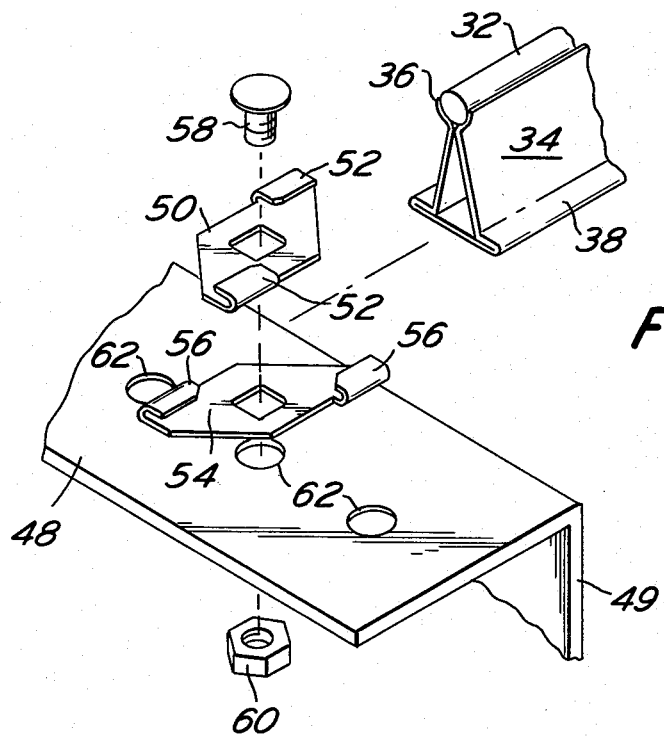
FIG. 4 is a partial exploded view of portions of the assembly.

Referring to FIG. 4, the member 48 has holes 62 at spaced points therealong. A pair of the holes 62 will be utilized to facilitate coupling member 48 to the runner supports 30 and 44. Only the attachment between runner support 30 and member 48 will be described in detail. Similar structure is provided for releasably coupling the runner support 44 to the member 48.

The runner support 30 is releasably coupled to the member 48 by way of clips 50 and 54. The clips are generally in the shape of a parallelogram. Clip 50 has flanges 52 on opposite sides thereof at diametrically opposite corners. Clip 54 is provided with similar flanges 56. Each of the clips has a centrally disposed hole adapted to be aligned with one of the holes 62 and through which extends the bolt 58. A nut 60 is threaded to the bolt 58. Flanges 52 and 56 on one side of the overlapping clips embrace one of the flanges 38. The other flange 38 on the runner support 30 is embraced by the flanges 52 and 56 on the other side of the clip arrangement. See FIG. 1.

The central portion of the member 48 is cut away to define a notch. At the notch, the flange 64 is defined by bending rearwardly a portion of the wall 48. See FIG. 2. A brake means is mounted in the notch on member 48. The brake means includes side walls 66 and 68 connected at their upper end by a top wall 70. As will be apparent from FIG. 2, a portion of the top wall 70 is cut away so as to permit a roller 72 to be supported by the side walls 66 and 68 for rotation about the axis of shaft 73. Roller 72 preferably has a rough surface for good frictional contact.

The roller 72 is preferably in the form of a soft rubber coating on a core. The coating may be any one of a wide variety of polymeric plastic materials such as polyurethane. A brake pad support member 74 is supported by the side walls 66 and 68. Member 74 includes legs 76 and 78 pivotably supported for movement about the axis of shaft 80. Shaft 80 extends between the side walls 66 and 68. See FIGS. 2 and 3. A brake pad 86 is attached to the support member 74 and is adapted to contact the roller 72 to prevent the same from rotating about the axis of shaft 73.

Springs 82 and 84 are provided to bias the support member 74 and pad 86 to a pivotable position wherein the pad 86 contacts the roller 72. Spring 82 extends between the top wall 70 and the leg 76. Spring 84 extends between the top wall 70 and the leg 78. As will be explained hereinafter, a release mechanism for the container 46 controls the biasing effect of the springs 82 and 84 whereby roller 72 is prevented from rotating when the release mechanism is in its release position and roller 72 is free to rotate when the release mechanism is in its blocking position. As illustrated in FIGS. 2 and 3, roller 72 is mounted so that it will be above a plane defined by the upper surface of the runners 32 and 32'.

As shown more clearly in FIGS. 1 and 2, the release mechanism includes a bracket 88 supported by the beam 12 and having upwardly extending legs 90 and 92 for supporting a transversely disposed shaft 94. Rollers 93 and 95 are provided on the shaft 94 for rolling contact with a bottom surface of the container 46. Arm members 96 and 98 are rotated by shaft 94 at a location intermediate the ends of the arm members 96 and 98.

The portions of the arm members 96 and 98 which project in a direction from the shaft 94 toward the roller 72 are shorter than the portions of the arm members on the opposite side of the shaft 94 and are interconnected by shaft 100. Shaft 100 rotatably supports a plurality of rollers 104 which are of smaller diameter than the rollers 93 and 95. When the release mechanism is in a blocking position as shown in solid lines in FIG. 2, the longitudinal axis of shaft 100 is at an elevation which is slightly below the elevation of the longitudinal axis of shaft 94.

The free ends of the arm members 96 and 98 to the left of shaft 94 in FIG. 2 are interconnected by a shaft 102. Shaft 102 has a plurality of rollers 106 supported thereby. Parallel to the shaft 102, there is provided a cross brace 108 extending between the arm members 96 and 98. A stop member 110 is provided on the brace 108 for contacting the leading portion of the container 46 and restraining the same.

A generally Z-shaped clip 112 is associated with the shafts 94 and 100 as shown in FIG. 2. Shaft 94 is below and tangent to two adjacent legs of the clip 112. Shaft 100 is above and tangent to two adjacent legs of the clip 112.

A flexible member such as the wire member 114 has one end connected to the clip 112 and its other end connected to the brake pad support member 74. The length of the wire member 114 is adjusted so as to tension the springs 82, 84 and cause the pad 86 to assume the solid line position shown in FIG. 2. The wire member 114 extends beneath the shafts 94, 100, and over the guide clip 116 on the flange 15 of the beam 12. As shown more clearly in FIG. 1, the wire member 114 is generally parallel to the runners 32, 32'.

The arm members 96 and 98 are adapted to rotate from the solid line blocking position shown in FIG. 2 to the phantom release position shown in FIG. 2 by means of an actuator 118. Actuator 118 may be selectively moved from a remote location by means of a solenoid, a cylinder, etc.

The lane brake assembly 10 of the present invention is utilized as follows. A signal is sent from a remote location to the solenoid or other device associated with actuator 118 to cause the latter to pivot the release mechanism from the solid line position shown in FIG. 2 to the phantom position in FIG. 2. Such pivotable movement of the arm members 96 and 98 elevates the shaft 100. As the shaft 100 moves upwardly in a counterclockwise direction in FIG. 2, the rollers 104 move into contact for rolling support of the bottom of container 46. This movement permits the wire member 114 to become slack whereby the spring 82, 84 rotate the member 74 so that the pad 86 contacts the roller 72.

The container 46 discharges onto a conveyor not shown under the force of gravity. Container 46' is in contact with the roller 72 which at this time is prevented from rotating. Hence, roller 72 applies a braking force to the bottom surface of container 46', which force is of sufficient magnitude to prevent the container 46' from moving forwardly until roller 72 is permitted to rotate about the axis of shaft 73.

The release mechanism may be caused to move from the phantom position in FIG. 2 to the solid line position in FIG. 2 by its actuator 118 or a return spring. When the release mechanism moves from the blocking position shown in solid lines in FIG. 2, the wire member 114 is again tensioned so as to pivot the pad 86 in a counterclockwise direction in FIG. 2 about the axis of shaft 80 whereby pad 86 no longer contacts roller 72. Under the force of gravity or some other force, the container 46' moves from right to left in FIG. 2 until it engages the stop member 110 on the release mechanism thereby assuming the position of container 46 as illustrated in FIG. 2.

Since the roller 72 is adjustably positioned, it may be located at the proper location for engaging the bottom surface of the second container in the lane. If the size of the containers changes, it is only necessary to loosen the two nuts 60, slide the member 48 to the proper location, and then tighten the nuts 60. This adjustment can be accomplished with a conventional pair of pliers. Hence, no special tools are needed and the adjustment can be made in a matter of minutes. The lane brake assembly is readily adjustable to fit different lane widths. Thus, the runner supports 30 and 44 adjustably support the member 48 at any one of a variety of locations defined by the holes 62. Substantially the entire range of lengths of containers may be accommodated by supplying wire members 114 of three different lengths, short, medium and long.

Installation of the lane brake assembly on new or existing equipment in the field is accomplished in a matter of minutes. Member 48 is bolted to the runner supports 30 and 44 as described above. The clip 112 is then positioned as shown. The wire member 114 is interconnected with the brake pad support member 74 and the clip 112. Installation is thereby completed and no modifications of the existing apparatus are required in order to accommodate the lane brake assembly 10.

The release mechanism need only be maintained in its release position by actuator 118 for a short time period which is generally less than one second. As the release mechanism moves toward its blocking position, rollers 106 contact the bottom surface of the container 46 while rollers 104 lose contact with the bottom surface of the container 46. Hence, stop member 110 will pivot into the gap between containers 46 and 46' so as to be in its blocking position when it contacts the front end of container 46'.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising means defining an inclined lane having sides and a discharge end along which containers are to be located for singular discharge at said end, said lane including at least two runners for contact with containers in said lane, means defining a support for said runners, a release mechanism at the discharge end of said lane, said mechanism being movable from a blocking position to a release position, a brake means positioned upstream from said mechanism for selectively retarding movement of a second container in the lane when said release mechanism is in its release position, said brake means including a roller mounted between said runners for rotation about its longitudinal axis, the upper surface of said roller being at an elevation above the elevation of an adjacent portion of said runners, a brake pad mounted for pivotable movement toward and away from said roller, spring means biasing said pad toward said roller for contact therewith, a flexible wire-like member extending between said release mechanism and said brake pad, said wire-like member being responsive to movement of said release mechanism so that said brake pad is ineffective when the release mechanism is in a blocking position and the brake pad applies a braking force under the bias of said spring means to prevent rotation of said roller when the release mechanism is in its release position.

2. Apparatus in accordance with claim 1 wherein said release mechanism is mounted for pivotable movement about a horizontal shaft whose axis is transverse with respect to the lane, one end of said wire-like member being connected to a clip associated with said shaft.

3. Apparatus in accordance with claim 1 including means releasably coupling the brake means to said runner support for adjustment of the brake means along the length of the runner support in a direction toward and away from said release mechanism.

4. Apparatus in accordance with claim 1 including a pair of discrete runner supports, means for supporting the runner supports at different distances from each other, and means for mounting the brake means on the runner supports at different locations transverse with respect to the lane.

5. Apparatus in accordance with claim 1 wherein said roller includes an outer periphery of polymeric plastic, said mechanism being pivotably mounted about the axis of a shaft located beyond but adjacent the discharge end of the runners.

6. Apparatus in accordance with claim 1 including at least one roller supported beyond the discharge end of said runners, means connecting said last mentioned roller with said mechanism so that said last mentioned roller moves upwardly to a position for contact with the bottom of a container in response to movement of said mechanism to its release position.

7. Apparatus in accordance with claim 1 wherein said mechanism is mounted for pivotable movement about an axis located beyond but adjacent to the discharge end of said lane, and an actuator connected to said mechanism to facilitate activation from a remote location.

* * * * *